United States Patent

Hotchkiss

[15] 3,638,643
[45] Feb. 1, 1972

[54] ENDOSCOPE FOR PHOTOGRAPHIC RECORDING

[72] Inventor: John E. Hotchkiss, Corte Madera, Calif.
[73] Assignee: Hotchkiss Instruments, Inc.
[22] Filed: Aug. 29, 1968
[21] Appl. No.: 756,112

Related U.S. Application Data

[63] Continuation-in-part of Ser. No. 675,811, Oct. 17, 1967, abandoned.

[52] U.S. Cl. .................................. 128/9, 95/11, 128/22, 351/16
[51] Int. Cl. .................................. A61b 1/22, A61b 1/04
[58] Field of Search .................... 128/3–16, 18, 23, 128/395; 240/2.18, 6.41, 10.6, 10.62, 59; 351/6, 38, 15, 16; 350/277; 95/11 HC, 12, 86

[56] References Cited

UNITED STATES PATENTS

| 799,114 | 9/1905 | Tracey | 240/2.18 X |
|---|---|---|---|
| 1,608,726 | 11/1926 | De Zeng | 128/9 |
| 1,741,526 | 12/1929 | Kuhl | 95/11 |
| 2,280,561 | 4/1942 | Wappler | 95/11 |
| 2,327,612 | 8/1943 | Stone et al. | 351/7 |
| 2,699,770 | 1/1955 | Fourestier et al. | 128/6 |
| 2,823,666 | 2/1958 | Hallpike et al. | 128/9 |
| 2,902,911 | 9/1959 | Noyori | 351/7 X |
| 2,936,753 | 5/1960 | Storz | 128/6 |
| 3,016,000 | 1/1962 | Noyori | 128/12 |
| 3,021,835 | 2/1962 | Rose | 128/6 |

FOREIGN PATENTS OR APPLICATIONS

| 140,144 | 1/1961 | U.S.S.R. | 95/11 |

Primary Examiner—Richard A. Gaudet
Assistant Examiner—Kyle L. Howell
Attorney—Warren, Rubin, Brucker & Chickering

[57] ABSTRACT

An endoscope having a housing with a viewing aperture aligned with a sight aperture and a sight passage therebetween. A light source directs focusing and photographic flashlight rays onto a mirror mounted to the housing between the apertures for the coaxial reflection of such light rays along the axis of the sight passage and through the sight aperture. A mounting member connects a camera with the endoscope so that the optical axis of the camera is aligned with the sight passage whereby the exact area being photographed is coaxially illuminated by both focusing and photographic flashlight rays. Terminals electrically couple a light source mounted to the housing for illumination of a cavity to be photographed with an electric power source. The terminals furthermore mechanically secure the mounting member to the housing. A universally movable support structure mounts the camera and the endoscope and permits their alignment with the organ.

13 Claims, 6 Drawing Figures

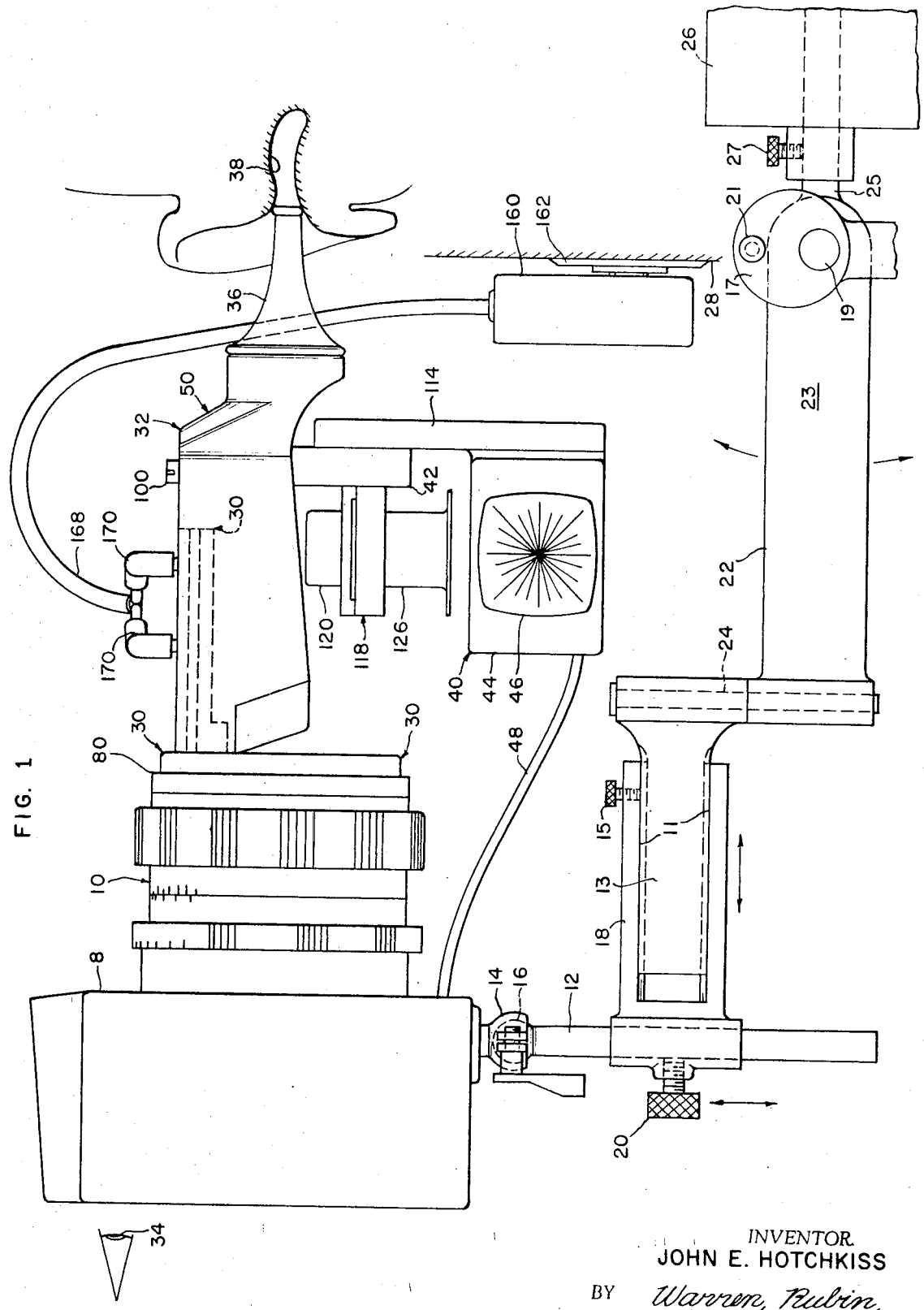

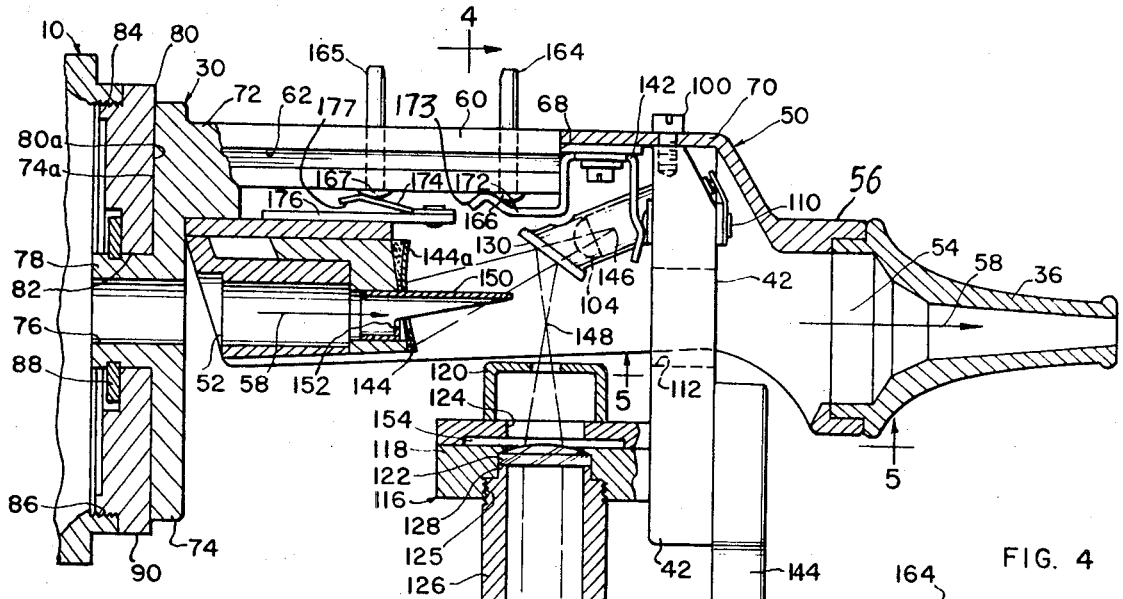

ENDOSCOPE FOR PHOTOGRAPHIC RECORDING

RELATED APPLICATIONS

This is a continuation-in-part application of the pending patent application, Ser. No. 675,811, filed Oct. 17, 1967, for "Endoscope Having Improved Illumination System," and is further related to the commonly owned copending patent applications bearing Ser. No. 755,660, filed Aug. 27, 1968, for "Endoscope With Coincident Illumination And Viewing," and Ser. No. 755,661, field Aug. 27, 1968, for "Endoscope."

BACKGROUND OF THE INVENTION

This invention relates to endoscopes for photographing areas in cavities and more particularly to an endoscope in which the exact area being photographed is illuminated by a focusing and a photographic flashlight.

In the study and treatment of sickness and disease photographic pictures of cavities of affected organs are a valuable tool for future reference; for the magnification of the organ to see that which the bare eye is unable to discern; or as a visual aid in studying the symptoms, behavior, etc., of the affected organ. The taking of photographic pictures of cavities, such as the ear canal, for example, requires a focusing light to illuminate the cavity while the camera is adjusted and set up, and a photographic flashlight for the high intensity illumination of the cavity while the photograph is being taken.

Otoscopes are a standard instrument for a medical practitioner and enable him to view the ear canal and the tympanic membrane of the ear. Since the line of sight of the otoscope must be aligned with the optical axis of the camera and prior art otoscopes have no provisions for such an alignment, photographic pictures of the ear canal and the tympanic membrane have not been readily available. More particularly, it is virtually impossible to manually maintain the otoscope and the camera in alignment; the illumination of the ear canal is insufficient for photography; and prior art otoscopes provide a generally inadequate lighting of the ear canal, as more fully described in the above referred to copending patent application entitled "Endoscope With Coincident Illumination And Viewing," which hampers the proper positioning of the camera for the subsequent photography.

As a consequence, unless a practitioner can afford to go through substantial efforts and to expend large amounts of time and money to properly set up a camera, pictures of cavities such as the ear canal are not available. The ensuing loss to the medical profession particularly and to the public generally from being unable to photograph such cavities each time that may be desirable, even if it is for apparently insignificant reasons, cannot be expressed in economic terms. It is substantial and may have retarded the increase in our knowledge with respect to such organs and the diseases with which they may be affected.

Prior art devices especially adapted for photographing cavities are heavy and cumbersome to handle and the intricacy of their construction makes them too expensive for a general and widespread use. Such devices require two light sources, one low intensity light for use during the focusing of the camera on the area being photographed, and one high intensity flashlight during the actual taking of the picture. A plane mirror reflects the photographic flash substantially coaxially with the line of sight through the device to fully illuminate the area photographed by the camera. The focusing light, however, is placed outside and nonparallel to the line of sight, resulting in parallax error. Consequently, during the setup of the camera the illuminated area does not coincide with the area seen by the operator or photographed by the camera. This disparity worsens with an increase in the distance between the focusing light and the area being photographed so that at one point the two areas do not even overlap, i.e., the photographed area is not illuminated at all. This, of course, results in photographs of inferior quality. In addition prior art devices often include lenses, glass plates, beam splitters, etc., between the camera and the cavity which cause optical obstructions, accumulate dirt, can fog up, and thus decrease the picture quality further. Such optical obstructions additionally act as light beam splitters, whether or not intended as such. Beam splitters reduce the intensity of light directed toward the area being photographed as well as returning from that area. Depending on the particular positioning of the beam splitter with respect to the direction of light rays, a total reduction of the light intensity of as much as 80 and 90 percent can result.

SUMMARY OF THE INVENTION

The present invention provides an endoscope for use with a photographic camera to obtain a photographic record of an area of a cavity. Briefly, the invention comprises a housing having a viewing aperture aligned with a sight aperture and an unobstructed sight passage therebetween. A preferably concave reflector is disposed between the apertures and mounted to the housing opposite a light source directing focusing light rays and photographic flashlight rays onto the reflector. The latter reflects the light rays coaxially along the axis of the sight passage past the sight aperture. A mounting member connects the camera and the housing and aligns the camera optics with the sight passage. The area photographed thereby exactly coincides with the area illuminated by the focusing and the photographic flashlight rays reflected by the mirror.

In the presently preferred embodiment of the invention, the light source comprises a beam splitter, a focusing light directing light rays through the beam splitter onto the mirror, and a photographic flashlight directing light rays at the beam splitter which reflects a portion of such light onto the mirror. This enables the positioning of the two lights so that light rays reflected by the mirror are coaxial to eliminate the heretofore troublesome parallax error. Thus, the operator can adjust and set the camera to precisely photograph the desired area since the focusing light illuminates that area at all times. Then, when the camera is actuated, the flashlight again illuminates that precisely same area. At the same time the optical path between the camera lens and the area being photographed remains unobstructed to eliminate all sources of glare and distortions whereby photographs of the highest quality are obtained.

The firm connection between the endoscope and the camera provides for their automatic alignment to enable the quick and economic photographic recording of cavities. Means mounting the photographic flashlight to the housing are constructed to fit endoscopes having interfaces constructed according to the endoscope disclosed in the above referred to copending patent application for "Endoscope" to require minimal expenditures in adapting such endoscopes for the taking of photographic pictures. The ease with which pictures are taken is enchanced by the provision of a holder for the photographic flashlight which is readily installed in the endoscope disclosed in that patent application and which furthermore accurately positions the focusing light and the photographic light with respect to the concave mirror. A universally movable support structure to which the camera and the endoscope can be secured is additionally provided to increase the convenience and speed with which pictures can be taken in a physician's office during routine examinations, for example.

BRIEF DESCRIPTION OF THE DRAWINGS

FIG. 1 is an elevational view of a universally movably mounted single reflex camera of a photographic flashlight attached to an endoscope constructed according to the present invention;

FIG. 2 is a fragmentary, partially in cross section enlarged sectional view;

FIG. 3 is an enlarged, fragmentary, sectional view of the light source and the photographic flashlight reflector disposed in the endoscope;

FIG. 4 is a sectional view of the endoscope and the photographic flashlight and is taken on line 4—4 of FIG. 2;

FIG. 5 is a fragmentary plan view, in section, taken on line 5—5 of FIG. 2; and

FIG. 66 is a fragmentary, sectional view of a preferred construction of a portion of the photographic flashlight.

DESCRIPTION OF THE PREFERRED EMBODIMENTS

Referring to FIG. 1, a conventional single lens reflex camera 8 has camera optics 10 including a lens (not shown) on the optical axis (not shown) of the camera and is mounted on a support structure which comprises an upright post 12 with a releasable clamp 14 engaging ball 16 at the upper end of the post. Clamp 14 and ball 16 permit the tilting of the camera to vary the angular inclination between the optical axis of the camera and the axis of post 12. The upright post is vertically adjustably secured to a horizontal arm 18 by a set screw 20 to permit the raising and lowering of the camera. The horizontal arm defines a pair of laterally spaced guide rails 11 engaging an elongate, flat slide bar 13 pivotally connected to a swing arm 22 by a pin 24 journaled in the slide bar and the swing arm. Guide rails 11 can move slideably along slide bar 13 to lengthen or shorten the distance between post 12 and pin 24. A set screw 15 permits the fixation of guide rails on the slide bar at any point. Suitable stops (not shown) are provided to prevent the accidental disengagement of the guide rails and the slide bar.

SWing arm 22 is positioned between bifurcated leaves 17 supported by a conventional tripod or standard (not shown). The swing arm is further journaled on a pivot shaft 19 disposed between and mounted to the bifurcated leaves. A tension bolt 21 engaging the bifurcated leaves and disposed parallel to pivot shaft 19 permits inner faces of the leaves to be biased toward sides 23 of the swing arm to frictionally lock the swing arm to the leaves. Swing arm 22 extends past pivot shaft 19 to form a mounting bar 25 for a balancing or counterweight 26 slideably disposed on the mounting bar. The mounting bar can be integrally constructed with the swing arm, or it can be secured thereto as by threading the mounting bar into the swing arm. A set screw 27 fixes the balancing weight to the mounting bar.

The support structure for the camera permits the universal movement of the latter in all directions. The adjustable counterweight enables the balancing of the cameras of different sizes and weights and compensates for the lengthening or shortening of the distance between post 12 and pin 24 by slideably moving guide rails 11 along slide bar 13. Thus, the camera can be effortlessly positioned at any point within the reach of the support structure without having to tediously and time consumingly set and adjust a great number of components.

Referring to FIGS. 1 and 2, a mounting member 30 is secured to the camera optics 10 and an endoscope 32, which in its basic aspects is more fully described in the above referenced copending patent applications, and aligns the endoscope with the camera optics. A line of sight is thereby established from eye 34 to the viewer, through the camera and the endoscope, past speculum 36 secured to the endoscope, and into a hollow organ or cavity, such as an ear canal 38, of a person being examined.

Also secured to the endoscope is a photographic flashlight 40 mounted on a holder 42 and which includes a socket 44 that may contain a power source, such as electric batteries (not shown), for a flashbulb or cube 46 of a conventional construction. A lead 48 is coupled with the release mechanism (not shown) of camera 8 in a well-known manner so that operation of the release mechanism causes the illumination of the flashcube.

Referring to FIG. 2, the endoscope comprises a housing 50 which includes a viewing aperture 52 proximate camera 8 and a sight aperture 54 defined by a cylindrical portion 56 of the housing to which speculum 36 is secured. The interior of the housing between the viewing and the sight apertures defines a sight passage 58 the axis of which is maintained in alignment with the optical axis of camera 10 by mounting member 30. As used in this specification, the term "sight passage" denotes that unobstructed space intermediate the viewing and the sight apertures through which the sight aperture is visible from the viewing aperture, or vice versa. Thus, there is an unobstructed line of sight from the camera optics to the ear canal 36 to insure photographic pictures of the highest quality.

Referring to FIGS. 2 and 4, the mounting member comprises an elongate slide bar 60 which has opposing grooves 62 extending the length of the bar for engagement with projections or rails 64 defining an interface 66 of the housing. When engaged with the interface forward end 68 of the slide bar abuts a bottom member 70 of housing 50 to provide the proper positional relationship between the slide bar and the housing.

A rear end 72 of the bar includes a preferably circular flange 74 that may be integrally constructed with the bar or that may be secured thereto as by threaded bolts (not shown). The flange has a central aperture 76 and a cylindrical portion 78 extending from the flange opposite to the slide bar and concentrically with the aperture. A mounting disc 80 has a cylindrical bore 82 that fits snugly over the exterior of the cylindrical portion of the flange and an external thread 84 formed to match with an internal thread 86 of the camera optics 10. A spring retainer ring 88 is disposed in a groove of the cylindrical portion of flange 74, secures the mounting disc to the flange, and permits relative rotational movements between the two. Mounting disc 80 includes an outwardly extending annular projection 90 that is knurled (not shown) on its exterior surface to provide a gripping surface when threading the mounting disc onto the camera optics.

To obtain an alignment between sight passage 58 and the optical axis of the camera, mounting member 30 is constructed so that the distance between the center of groove 62 and the axis of aperture 76 in circular flange 74 equals the distance between the center of rails 64 on housing 50 and the axis of the sight passage. Since the external threads 84 on mounting disc 80 are concentric with aperture 76, due to the snug fit between cylindrical portion 78 and bore 82, the optical axis of the camera optics is automatically aligned with the sight passage each time mounting member 30 is secured to the camera and the endoscope. The connection between circular flange 74 and mounting disc 80 permits rotational movements between the two whereby the endoscope can be rotated with respect to the camera. Disalignment of the camera and the endoscope is further prevented by the relatively large mating faces 74a and 80a of the mounting flange and the disc, respectively, which are kept in engagement by spring ring 88.

Referring now to FIGS. 2, 3, and 5, endoscope housing 50 includes a generally elongate opening 92 (best seen in FIG. 5) and walls 94 of the housing define a pair of aligned and laterally spaced rectangular grooves 96 extending from the end of the housing walls to bottom member 70. Holder 42 has a rectangular cross section and a width slightly less than that of grooves 96 to permit its slideable insertion therein until its lower end 98 engages the bottom member. The lower end 98 includes a threaded hole engaged by a threaded bolt 100 extending through an aperture 102 in bottom member 70 and firmly securing the holder to the housing. A focusing light 104 of a conventional construction is threadably mounted in holder 42 and engages a contact 106 which is insulated from the holder at 108 and secured thereto by an insulated fastener such as a rivet 110.

The holder includes an aperture 112 in alignment with the sight passage 58, extends through opening 92 past housing 50 and its other end mounts an angle bracket 144 (best seen in FIG. 4) which mounts and positions the photographic flashlight 40.

Referring now to FIGS. 2 and 4, holder 42 also mounts flashlight optics 116 between the photographic flashlight and focusing light 104. The flashlight optics comprises a lens holder 118 secured to holder 42, an apertured light shield 120, and a light converging lens 122 mounted in a bore 124 of the lens holder. The lens holder bore is stepped up on the side facing the photographic flashlight to nest the lens in the bore and the outermost end of the bore is internally threaded at 125 to engage the external threads of a cylindrically tubular sleeve 126. An annular projection 128 of the sleeve extends into the stepped up bore and secures the lens to holder 118. This firmly mounts lens 122 in holder 124 and, for purposes more fully set forth below, permits its interchange with lenses of different focal lengths.

Referring to FIGS. 2, 3 and 4, a flat circular and transparent reflector plate or beam splitter 130, constructed of glass or a transparent plastic material which permit the passage of almost all light meeting its flat surfaces at right angles, is secured to an elongate tubular jacket 132 which is flared at 134 and there mounts the beam splitter. The opposite end of the jacket includes means, such as a slot 136 in the jacket and an orientation pin 138 in holder 42, for example, for properly positioning the jacket and the beam splitter. A cutout 140 prevents the jacket from contacting and short circuiting with an electric terminal strip 142 coupling the light source with an electric power source as set forth below.

Light rays from focusing light 104 and photographic flashlight 40 must travel coaxially when leaving beam splitter 130 to assure their reflection by a mirror 144 coaxial until, i.e., along, the axis of sight passage 58. Furthermore, the plate, the focusing light and the photographic flashlight are positioned so that the axes of the respective light ray beams intersect the surface of the beam splitter plate facing mirror 144 at a common point. Beam splitter 130 can then be regarded as a single light source for the mirror providing a greater or lesser light intensity according to which one of the lights 40, 104 is energized. To obtain this coaxiality of the light rays the plate defining beam splitter 130 is positioned so that an angle of incidence of light rays from focusing light 104 on the plate equals the angle of incidence of light rays from photographic light 40 on the plate. The actual angle of incidence for the light rays can, of course, be adjusted according to well-known principles to permit the passage and reflection of a greater or lesser amount of focusing light rays and photographic flashlight rays, respectively. Thus, one may select an angle providing for the reflection of, say, only 10 percent of the photographic light rays on beam splitter 130. This, in turn, allows the passage of 90 percent of the focusing light rays through the beam splitter. Other ratios can, of course, be selected if that is deemed to be more desirable.

Referring to FIG. 2, mirror 144 is mounted on the interior of the housing and has a concave reflecting surface 144a which is spaced from a focal point 146 of focusing light 104 a distance substantially equal to the focal length of the reflecting surface of the mirror. The angular positioning of the axis on which focal point 106 lies is fully described in the above referenced copending patent application for "Endoscope With Coincident Illumination And Viewing." As is also more fully described in that patent application, it is preferred that focusing light 104 is slightly more distal from the reflecting surface of the mirror than focal point 146 so that light reflected by the mirror converges slightly toward the axis of sight passage 58. This results in a greater light intensity at the viewed area of the tympanic membrane. With the focusing light positioned as described in that patent application, light reflected by reflecting surface 144a is directed along the axis of sight passage 58, past sight aperture 54 and through speculum 36 into ear canal 38 (shown in FIG. 1).

Photographic flashlight 40 and more particularly flashbulb 46 is so positioned that its optical axis is aligned with the point at which the optical axis from focusing light 104 intersects the surface of beam splitter 130 facing mirror 144 (see FIGS. 2 and 4). Lens holder 118 and the lens is selected to converge the photographic light at a focal point 148 spaced from the beam splitter a distance equal to the spacing between the beam splitter and focal pint 146 of the focusing light 104. Thus, the distance between reflecting surface 144a and focal point 148 via the beam splitter equals the distance between the reflecting surface and the focal point of focusing light 104 so that photographic light rays reflected by the mirror are directed along the axis of the sight passage, past sight aperture 54 and through speculum 36 into ear canal 38 where they illuminate the same area of the tympanic membrane as do the focusing light rays.

To reduce glare in the viewer's eye when viewing the ear canal through camera 8 light rays coming from beam splitter 130 are blocked from reaching viewing aperture 52 by a light shield 150 extending through an aperture in mirror 144. The light shield includes a lug 152 depending into the sight aperture adjacent the mirror aperture for preventing light rays refracted at the edge of the mirror hole not protected by the light shield from reaching the viewing aperture and causing sight disturbing glare.

Turning now to the operation of the endoscope, camera 8 is first mounted on the upright post 12, mounting member 30 is secured to the camera and the endoscope, and holder 42 is positioned in rectangular groove 96 and secured to the housing with threaded bolt 100. The endoscope is now aligned with ear canal 38, speculum 36 is positioned adjacent the outer end of the canal, and a light switch 154, shown in FIG. 4, is closed to energize focusing light 104. Light rays from the focusing light are reflected by mirror 144 along the sight passage and to the tympanic membrane at the end of the ear canal. The viewer can now observe the tympanic membrane through the single lens reflex camera 8. The illuminated area of the tympanic member is the same as that viewed by him since the line of sight coincides with the line along which the reflected light is directed. While viewing the illuminated area of the tympanic membrane, the camera is placed in its proper position and its mechanism is adjusted for taking a photographic picture of that area. Depression of the camera actuating button (not shown) opens the shutter (not shown) of the camera and simultaneously causes the illumination of flashcube or bulb 46 of photographic flashlight 40. Photographic light rays are directed through sleeve 126, past lens 122, and converge at focal point 148. A portion of the photographic light rays striking beam splitter 130 are reflected towards mirror 144. The photographic light rays striking mirror 144 are further reflected by the mirror and directed along the sight passage and in alignment with the line of sight from the camera to illuminate the area viewed by the camera with sufficient intensity to permit the taking of photographic black and white or color pictures with conventional, short exposure times.

If the endoscope is used for photography of deep cavities, say at the end of a pipe (not shown) that may be many feet long, it is desirable to replace lens 122 with one having a focal length which causes light rays reflected by mirror 144 to travel more nearly or fully parallel to the axis of sight passage 58. A premature focusing of the reflected photographic light and a resulting loss in the light intensity at the object to be photographed is thereby prevented.

Referring to FIG. 6, as an alternative to replacing lens 122 with one having a different focal length, the lens can be mounted directly in a tubular sleeve 126a. The end of sleeve 126a inserted into lens holder 118 (not shown in FIG. 6) includes a recessed portion 126b in which lens 122 is disposed. A spring ring 127 in an annular groove firmly mounts the lens to the sleeve. In all other respects the construction of sleeve 126a is identical to that of sleeve 126 shown in FIG. 2. Sleeve 126a can be rotated in lens holder 118 to move lens 122 toward or away from beam splitter 130 due to the threadable engagement between the sleeve and the lends holder. This movement of the lens represents its focal point and changes the distance between the focal point and mirror 144. It permits changing the degree to which the reflected photographic light rays are converged toward the axis of sight passage 58 without having to disassemble flashlight optics 116 to install a new lens.

Referring to FIG. 2, it is frequently desirable to filter photographic light from flashbulbs 46 to obtain certain color effects, to shunt a particular color from the artificial light, or to reduce the light intensity for certain types of photographic film. Filters (not shown) for such purposes can be inserted into a slot 154 defined by lens holder 118 of the flashlight optics 116. The slot is closely adjacent lens 122 and permits the quick, slideable insertion of filters without the need for special tools or cumbersome assembly procedures.

Referring to FIGS. 1 and 2, an electric power source, such as a conventional transformer 160 constructed to be plugged into a wall outlet 162 and energized by ordinary house current, for example, is provided for energizing focusing light 104. A pair of insulated terminal pins 164, 165 project from slide bar 60 of mounting member 30 and form heads 166, 167 on the interior of the bar. A lead 168 and conventional jacks 170 form the electrical connection between the transformer and the terminal pins.

Terminal 142 forms an electrical connection between terminal pins 164 and focusing light 104 and includes a spring loaded arm 172 extending from the end of bottom member 70 abutting slide bar 30 toward the viewing aperture 52. Arm 172 is biased toward the slide bar 60 when the latter is attached to the endoscope to engage a detent 173 at the free end of the arm with head 166 of pin 164. A second spring loaded terminal 174 is mounted on an insulating plate 176 secured to housing 50 adjacent interface 66, and includes a detent 177 biased into engagement with head 167 of pin 165. Terminal 174 is conventionally connected with a switch 184 (see FIG. 4, not shown in detail) which, in its open position, is insulated from housing 50 and in its closed position electrically couples terminal 174 with the housing. Since terminal 142 is coupled with the head of rivet 110, as described above, focusing light 104 is energized upon the closure of switch 184.

Aside from establishing an electric connection with terminal pins 164, 165, spring-loaded arm 172 and terminal strip 174 are positioned and biased into engagement with heads 166, 167 to form a mechanical snap-in lock which releasably secures mounting member 30 to housing 50. The connection is quickly formed by simply aligning grooves 62 in bar 60 with projection 64 of housing interface 66 and slideably moving the two toward each other until end 68 of the bar abuts bottom member 70. This automatically establishes the lock which is released by applying sufficient force to the mounting member to slide heads 166, 167 past detents 173, 177 on the spring loaded arm and terminal.

Referring to FIGS. 2 and 4, the interengagement between terminal 142 and the head of rivet 110 on holder 42 establishes a similar snap in lock which retains holder 42 in grooves 96 while bolt 100 is not threaded into lower end 98 of the holder. The insertion of an object (not shown) through aperture 102 in bottom member 70 permits the ejection of the holder against the holding force from terminal 142.

Photographic pictures taken with endoscope 32 secured to camera 8 are of a quality that was heretofore difficult or impossible to achieve. The high quality of the pictures results from the virtually perfect alignment of the camera and the endoscope; the fact that the illuminated and the photographed areas are the same; the high light intensity at the time the picture is taken; and the lack of optical distorting and glares on the picture from the unobstructed sight passage between the camera and photographed area.

The endoscope can also be used for routine, ordinary examinations of organs such as the ear canal in the manner fully described in the above referred to copending patent applications. It merely requires the removal of mounting member 30 and holder 42 and their replacement with a mounting member and light source holder (not shown) permitting the viewing and illumination of the ear canal. Such a mounting member (not shown) may include a power source engageable with interface 66 of the housing while the light source holder, which may also mount a magnifying lens in the sight passage is inserted in grooves 96.

Modifications of the above-described embodiments of the invention can, of course, be made without departing from the scope of the invention. For example, beam splitter 130 can be replaced by a specially constructed light bulb capable of emitting a low intensity focusing light and short duration, high intensity photographic flashlight pulses to thereby eliminate the need for an independent focusing and photographic flashlight.

I claim:

1. An endoscope for use in connection with making a photographic reproduction of an area of a cavity comprising in combination:
    a generally elongate housing defining a sight aperture and a viewing aperture with a sight passage therebetween, said housing defining an opening between said apertures through which the interior of said housing is visible from a location exterior of said housing;
    a mirror mounted with said housing between said apertures and defining a mirror aperture which defines a portion of said sight passage, said mirror responsive to incident light to reflect such light along said sight passage toward said sight aperture;
    a focusing light mounted within said housing and disposed to direct light onto said mirror;
    a beam splitter mounted within said housing adjacent said opening defined by said housing and in opposing relation to said mirror; said beam splitter disposed to direct a portion of light incident thereupon to said mirror; and
    a photographic flashlight source secured to said housing exteriorly thereof and adjacent said opening and disposed to direct light onto said beam splitter.

2. The endoscope of claim 1 wherein said beam splitter is further described as being disposed between said focusing light and said mirror whereby focusing light is transmitted through said beam splitter before reaching said mirror.

3. The endoscope of claim 2 wherein said beam splitter comprises a flat transparent plate and said focusing light and said photographic flashlight are disposed relative to said plate to have the angle of incidence between said plate and focusing light equal to the angle of incidence between said plate and photograph flashlight whereby focusing light transmitted through said plate is coaxial with flashlight reflected by said plate.

4. The endoscope of claim 3 wherein said beam splitter is further described as comprising a tubular jacket supporting said plate and disposed over said focusing light.

5. The endoscope of claim 3 wherein said mirror is further described as being concave and thus having a finite focal length, the endoscope further comprising a converging lens secured to said photographic flashlight and disposed between said flashlight and said beam splitter plate, said converging lens operative to converge light from said flashlight to a point at a location between said lens and said plate, said focusing light disposed within said housing at a location which is a distance from said mirror which is substantially equal to the mirror focal length, and the location between said lens and said plate where light from said flashlight converges to a point is a distance from said plate which when added to the distance from said plate to said mirror is also substantially equal to the focal length of said mirror.

6. An endoscope for use with a single lens reflex camera, having an objective lens, for making photographic reproductions of an area of a cavity comprising in combination;
    a housing having a viewing aperture aligned with a spaced-apart aperture with a sight passage therebetween;
    a concave mirror defining a central aperture and mounted within said housing between said viewing aperture and said sight aperture and disposed to surround a portion of said sight passage, said mirror operative to reflect light incident thereupon along said sight passage toward said sight aperture;
    a beam splitter mounted within said housing in opposing relation to said mirror and operative to direct light incident thereupon toward said mirror;
    a focusing light mounted to said housing in opposing relation to said beam splitter whereby light from said focusing light falls on said beam splitter and is directed thereby to said mirror which directs such light along said sight passage toward said sight aperture;

a photographic flashlight mounted to said housing in opposing relation to said beam splitter whereby light from said flashlight falls on said beam splitter and is directed thereby to said mirror which directs such light along said sight passage toward said sight aperture;

mounting means adapted for securing the objective lens of a camera to said viewing aperture of said housing with the optical axis of the lens coaxially aligned with the axis of said sight passage.

7. The endoscope of claim 6 wherein said mounting means comprises:

a generally disc-shaped mounting member defining a central aperture;

a housing mounting member secured to said disc-shaped housing member, said housing mounting member operative to secure said housing to said disc-shaped mounting member and dispose said viewing aperture adjacent to and axially aligned with said central aperture of said disc-shaped mounting member;

a camera-mounting member secured to said disc-shaped mounting member, said camera-mounting member adapted to secure the objective lens of a camera to said disc-shaped mounting member and dispose the optical axis of the objective lens coaxial to said central aperture of said disc-shaped member.

8. The endoscope of claim 7 wherein said mounting means is further described by means rotatably securing said housing mounting member to said camera-mounting member.

9. The endoscope of claim 6 wherein said housing is further defined by a generally elongate interface formed in its exterior surface and said mounting means comprises:

a generally disc-shaped mounting member defining a central aperture;

a generally elongate interface member for interlocking with said housing interface and secured to, and extending perpendicular to the plane of, said disc-shaped member, said interface member secured to said disc-shaped member at a radial distance from the center thereof which disposes the viewing aperture of said housing in coaxial alignment with said central aperture of said disc-shaped member when said interface member interlocks with said housing interface; and a camera-mounting member having a generally disc shape and defining a central aperture, said camera-mounting member rotatably secured to said disc-shaped member about a common central axis, said camera-mounting member including means for securing to the camera objective lens and disposing the central axis of said camera-mounting member coaxially with the optical axis of the lens.

10. The endoscope of claim 6, wherein said housing defines an opening between said viewing aperture and said sight aperture, and further comprises:

a holder demountably secured in said housing adjacent said opening defined thereby and removable therefrom through said opening, said holder mounting said focusing light and said beam splitter.

11. The endoscope of claim 10 wherein said holder is further described as having a portion extending through said housing opening when disposed in place within said housing and mounting said photographic flashlight at a location exteriorly of said housing.

12. The endoscope of claim 11 further comprising a converging lens secured to said holder between said photographic flashlight and said beam splitter.

13. The endoscope of claim 12 further comprising converging lens mounting means securing said converging lens to said holder and including adjustable means by which the distance between said lens and said beam splitter is selectively variable.

* * * * *